(12) United States Patent
Schoenemann et al.

(10) Patent No.: US 11,980,314 B2
(45) Date of Patent: May 14, 2024

(54) METHOD OF OPERATING A STEAM GENERATOR, STEAM GENERATOR AND COOKING DEVICE WITH A STEAM GENERATOR

(71) Applicant: E.G.O. Elektro-Geraetebau GmbH, Oberderdingen (DE)

(72) Inventors: Konrad Schoenemann, Sulzfeld (DE); Elisabeth Stoetzner, Bretten (DE); Sebastian Erbe, Knittlingen (DE); Ralf Pawlowitsch, Karlsruhe (DE); Sebastian Eigl, Bretten (DE)

(73) Assignee: E.G.O. Elektro-Geraetebau GmbH, Oberderdingen (DE)

( * ) Notice: Subject to any disclaimer, the term of this patent is extended or adjusted under 35 U.S.C. 154(b) by 724 days.

(21) Appl. No.: 16/952,430

(22) Filed: Nov. 19, 2020

(65) Prior Publication Data
US 2021/0177188 A1    Jun. 17, 2021

(30) Foreign Application Priority Data

Dec. 16, 2019    (EP) .................................... 19216429

(51) Int. Cl.
*A47J 27/04*    (2006.01)
*A47J 27/16*    (2006.01)
(Continued)

(52) U.S. Cl.
CPC ................ *A47J 27/04* (2013.01); *F22D 5/26* (2013.01); *A47J 2027/043* (2013.01)

(58) Field of Classification Search
CPC ..... A47J 2027/043; A47J 27/04; F22B 1/285; F22B 35/00; F22B 37/78; F22D 5/26; F24C 15/327; H05B 1/0269
See application file for complete search history.

(56) References Cited

U.S. PATENT DOCUMENTS

| | | | | |
|---|---|---|---|---|
| 4,823,767 A | * | 4/1989 | Wust ....................... | A47J 27/16 122/451 S |
| 5,158,064 A | * | 10/1992 | Willis ..................... | A47J 27/04 126/369 |

(Continued)

FOREIGN PATENT DOCUMENTS

| | | |
|---|---|---|
| DE | 102013200277 A1 | 1/2014 |
| EP | 0832590 A2 | 4/1998 |

(Continued)

OTHER PUBLICATIONS

European Patent Office, Extended European Search Report received for Application No. 19216429.1, dated May 27, 2020, 5 pages, Germany.

(Continued)

*Primary Examiner* — Jorge A Pereiro
*Assistant Examiner* — Logan P Jones
(74) *Attorney, Agent, or Firm* — ALSTON & BIRD LLP

(57) ABSTRACT

A steam generator has a water container and an upper heating device and a lower heating device, a first temperature detection device covering a temperature detection area including the area covered by the two heating devices, a control device for monitoring and evaluating the first temperature detection device and for controlling the activation state of the two heating devices. A flat first temperature detection device covers the outside of the container, and a second spot-like temperature sensor is located on the water container in a region of an upper border of the upper heating device. Both temperature detection devices are used to activate and deactivate the two heating devices such that at first the lower heating device is activated to start generating steam as fast as possible.

24 Claims, 3 Drawing Sheets

(51) Int. Cl.
*F22B 35/00* (2006.01)
*F22B 37/78* (2006.01)
*F22D 5/26* (2006.01)
*F24C 15/32* (2006.01)
*A47J 36/00* (2006.01)
*A47J 36/32* (2006.01)
*F22B 1/28* (2006.01)
*H05B 1/02* (2006.01)

(56) References Cited

U.S. PATENT DOCUMENTS

| | | | |
|---|---|---|---|
| 10,835,072 B2* | 11/2020 | Shibuya | F24C 15/327 |
| 2005/0051531 A1* | 3/2005 | Shozo | F24C 15/327 |
| | | | 392/394 |
| 2009/0107477 A1 | 4/2009 | Frock et al. | |
| 2016/0316516 A1 | 10/2016 | Koebrich et al. | |
| 2017/0010005 A1* | 1/2017 | Tomoda | F22G 1/165 |
| 2017/0086257 A1 | 3/2017 | Muehlnikel et al. | |
| 2017/0164778 A1* | 6/2017 | Utsumi | F22B 1/285 |
| 2018/0264374 A1 | 9/2018 | Chatroux | |

FOREIGN PATENT DOCUMENTS

| | | | |
|---|---|---|---|
| EP | 2366315 | B1 | 3/2016 |
| EP | 2397755 | B1 | 10/2016 |
| EP | 3088800 | A1 | 11/2016 |
| EP | 3278691 | A1 | 2/2018 |
| JP | 2006-230433 | A | 9/2006 |
| JP | 2016-087123 | A | 5/2016 |
| KR | 2006-0118662 | A | 11/2006 |
| KR | 101000803 | B1 * | 12/2010 |
| KR | 20110112970 | A * | 10/2011 |
| WO | WO 2007/136268 | A1 | 11/2007 |

OTHER PUBLICATIONS

China National Intellectual Property Administration, Office Action, including Search Report, received for Application No. 202011489705.6, dated May 26, 2023, 5 pages, People's Republic of China.

* cited by examiner

METHOD OF OPERATING A STEAM GENERATOR, STEAM GENERATOR AND COOKING DEVICE WITH A STEAM GENERATOR

CROSS-REFERENCE TO RELATED APPLICATIONS

This application claims priority to European Application No. 19216429.1, filed Dec. 16, 2019, the contents of which are hereby incorporated herein in its entirety by reference.

FIELD OF APPLICATION AND PRIOR ART

The invention is directed to a method of operating a steam generator, in particular in a cooking device or a household device operating with steam. Furthermore, the invention is directed to such a steam generator as well as to a cooking device with such a steam generator. Steam generators for cooking devices for cooking purposes or the like are known for example from EP 2 366 315 B1 or EP 2 397 755 B1. A challenge with these steam generators is how to find a way to start the generation of steam with the steam generator as fast as possible, in order to be able to start operation of the household device quickly.

Problem and Solution

The object of the invention is to provide a method of operating a steam generator as well as such a steam generator and a cooking device with such a steam generator with which problems of the prior art can be avoided and, in particular, it is possible to speed up operating a steam generator and a household device provided with it.
This object is achieved with a method having the features of claim 1, a steam generator having the features of claim 22 and a cooking device having the features of claim 24. Advantageous and preferred embodiments of the invention are the subject matter of the further claims and will be explained in more detail hereunder. Some of the features are only described for the method, only described for the steam generator or only described for the cooking device. Independently of this, they can be applied to such a method, such a steam generator or such a cooking device independently and on their own. The wording of the claims by way of explicit reference is incorporated in the content of the description.

The steam generator comprises a water container, two heating devices on the water container, in particular applied to an outside thereof. The two heating devices are located separated from each other in different height regions viewed in vertical direction. One heating device is an upper heating device and the other heating device is a lower heating device. More separate heating devices could be provided. A flat first temperature detection device is provided and covers a temperature detection area. This temperature detection area includes at least the area covered by the heating devices, preferably also a surface of the water container between the heating devices. It can even be overlapping over the heating devices onto the outer surface of the water container or its lateral wall, respectively. The first temperature detection device can comprise a temperature sensitive layer, preferably a dielectrical isolation layer. At least one second temperature detection device in the form of a spot-like temperature sensor is provided, being located on the water container in a region of an upper border of the upper heating device or slightly above the upper heating device, respectively. A control device for evaluating the first temperature detection device and the second temperature detection device and for activating and deactivating the two heating devices is provided, preferably comprising a microcontroller. The control device can be for the steam generator alone or be provided for the whole cooking device.

The method comprises the steps of at first filling the water container with water, which is being made for a predefined first filling duration D1, for example 10 sec to 30 sec. After this first filling duration D1 has elapsed, the lower heating device is activated, and the upper heating device stays deactivated. The water container is still continuously filled further with water. In case the first temperature detection device detects a temperature exceeding a first predefined temperature threshold Tthr, the lower heating device is deactivated again, wherein the water container is still further filled with water. So the water container is continuously filled with water. When the first temperature detection device does not detect any temperature above the first temperature threshold Tthr, which should take place rather quickly, for example after 5 sec to 10 sec of cooling down the water container in the region of the lower heating device, but only a temperature below the first temperature threshold Tthr, the lower heating device is activated again. This may be tried for two or three times until the first temperature detection device does not detect any temperature above the first temperature threshold Tthr for a duration of at least 5 sec, in particular at least 10 sec. Then the control device defines the quantity of water in the water container to have a level l2, which is as high as 60% to 90% of a height of an upper rim of the lower heating device so that it is covered sufficiently by water to be activated continuously. Filling of the water container is continued, but now the steam generator does already generate steam, the steam generating having started preferably about 10 sec or 20 sec after the first temperature threshold Tthr has been reached for the first time.

As soon as the second temperature detection device detects a temperature of at least 95° C., preferably at least 95° C. for a time of more than 3 sec, which may mean that the temperature is from now on constantly above 95° C., the upper heating device and the lower heating device are both activated for heating operation. This temperature of at least 95° C. can be taken as a sign that now a sufficient amount of water is inside the water container not to cover the upper heating device, but to have sufficient steam or splashing water on the inside of the water container to absorb sufficient heat of the upper heating device that this heat can help for a fast steam generation, whereas the first threshold temperature Tthr is not reached too fast for the upper heating device to be deactivated again after only 2 sec to 5 sec.

This serves to provide a very fast generation of steam by activating the lower heating device at an early point of time when most probably it must be deactivated at least once, possibly also twice. But some heat can already be given into the water. Also an activation of the upper heating device when not water but mainly steam is there to absorb the heat can help to speed up the steam generation. Even if the first threshold temperature Tthr may be reached after activation of the upper heating device, only this upper heating device is deactivated for some seconds while the lower heating device continuously is still active.

The filling of water into the water container can be continued even further in an embodiment of the invention with the upper heating device being activated, wherein this filling may only be stopped when the first temperature detection device does not detect a temperature above the first temperature threshold Tthr for a second time for a second duration D2 of between 5 sec to 10 sec after the time before. This is then taken as a sign that now the water level is high enough to cover most part of the upper heating device so that the first temperature threshold Tthr is not reached by the heating operation of the upper heating device.

In a further embodiment it is preferably provided that in case the first temperature detection device detects a temperature above the first temperature threshold Tthr after the upper heating device has been activated, only the upper heating device is deactivated. The reason for this is that the water level at first falls below the level that is needed for a stable operation of the upper heating device, and only later on below the level that is needed for a stable operation of the lower heating device. Preferably the lower heating device can also be deactivated if the first temperature detection device again detects a temperature above the first temperature threshold Tthr after 2 sec to 5 sec after deactivating the upper heating device. Even if this is not very probable in a regular operation of the steam generator, it can be a reasonable measure.

In an even further embodiment a filling rate of filling water into the water container is not known. If the duration after having started filling the water container until the second temperature detection device detects a temperature of above at least 95° C. is less than a predefined filling duration threshold D3, a filling rate can be reduced by at least 5%, preferably by at least 20%. This is then a sign that the filling with water takes place faster than expected. The reduction may be made by clocking a pumping action of a water pump filling water into the water container with the filling rate being the pump filling rate. Alternatively, a valve for filling water may be partly closed to reduce the flow of water through it.

In a further embodiment, the upper heating device is deactivated for at least 3 sec after the filling the water container has been stopped for the first time, if the first temperature detection device detects a temperature above the first device threshold Tthr. This is a sign that the upper heating device has generated too much heat. More water is then filled into the water container, which will cool it down and absorb more heat generated by the upper heating device, and the upper heating device is then activated again.

In one embodiment, the lower heating device and the upper heating device are both activated simultaneously and together for a high rate of steam generation. They can be activated with their maximum power, wherein preferably they only can be activated with one single power rate.

In another embodiment, for generating a low rate of steam generation, preferably 20% to 90% below the high rate of steam generation mentioned before, only the lower heating device is activated and the upper heating device is deactivated. Then the lower heating device alone can be activated with the single power rate mentioned before.

Preferably a signal for stopping or starting to fill water into the water container can be generated by monitoring the first derivation by time of a temperature signal of the first temperature detection device. This allows for an easier detection of surpassing any given or predefined value.

It is possible to use for deactivating or activating at least one of the two heating devices, preferably only the upper heating device, an absolute value of the temperature signal of the first temperature detection device or the first derivation of this temperature signal by time. It is further possible, after having filled the water container with water and having stopped the filling process, when the first derivation of a temperature signal of the first temperature detection device by time is above a threshold value Vthr, filling water into the water container is started again. This may be for a predefined second filling duration D2 or until a temperature signal of the first temperature detection device has reached a temperature signal value of a point of time of 2 sec to 20 sec before filling the water container with water has started.

In another embodiment, the temperature detected by the first temperature detection device is monitored and a predefined duration is measured until the lower heating device has not been deactivated by a temperature signal of the first temperature detection device for at least 5 sec. The same can be done for the upper heating device until this is not deactivated by a temperature signal of the first temperature detection device. The time is measured until a lower heating device has not been deactivated for at least 5 sec, and then a measured filling rate FRm is determined by dividing a known water volume being defined by the location of the lower heating device on the water container by the time that has elapsed when the lower heating device has been activated or has not been deactivated.

It is further possible to compare the measured filling rate FRm with a predefined filling rate FRd which is known for this steam generator. If the measured filling rate FRm is more than 10% below the predefined filling rate FRd, it is determined that a calcification of the filling pump or of a filling valve is too high and a decalcification must be made because the filling rate is too low. Preferably a signal can be output for a user to execute such a decalcification process of the filling pump or that a repair must be made. Such a measured filling rate FRm can be even 20%, 30% or 40% below the predefined filling rate FRd for this action to take place.

In an embodiment, the control device can take an increased calcification as a trigger to start and/or stop filling the water container with water with a delay, preferably a delay of 3 sec to 10 sec. This takes the reduced filling rate into account.

These and further features will emerge not only from the claims but also from the description and from the drawings, wherein the individual features may be realized in each case individually or severally in the form of sub-combinations in an embodiment of the invention and in other fields, and may constitute advantageous and independently protectable embodiments for which protection is claimed here. The division of the application into individual sub-sections and sub-headings does not restrict the statements made here in terms of their general applicability.

BRIEF DESCRIPTION OF THE DRAWINGS

In the following, embodiments of the invention will be described in detail with reference to the drawings. Throughout the drawings, the same elements will be denoted by the same reference numerals.

DETAILED DESCRIPTION OF THE EMBODIMENTS

Figure 1:
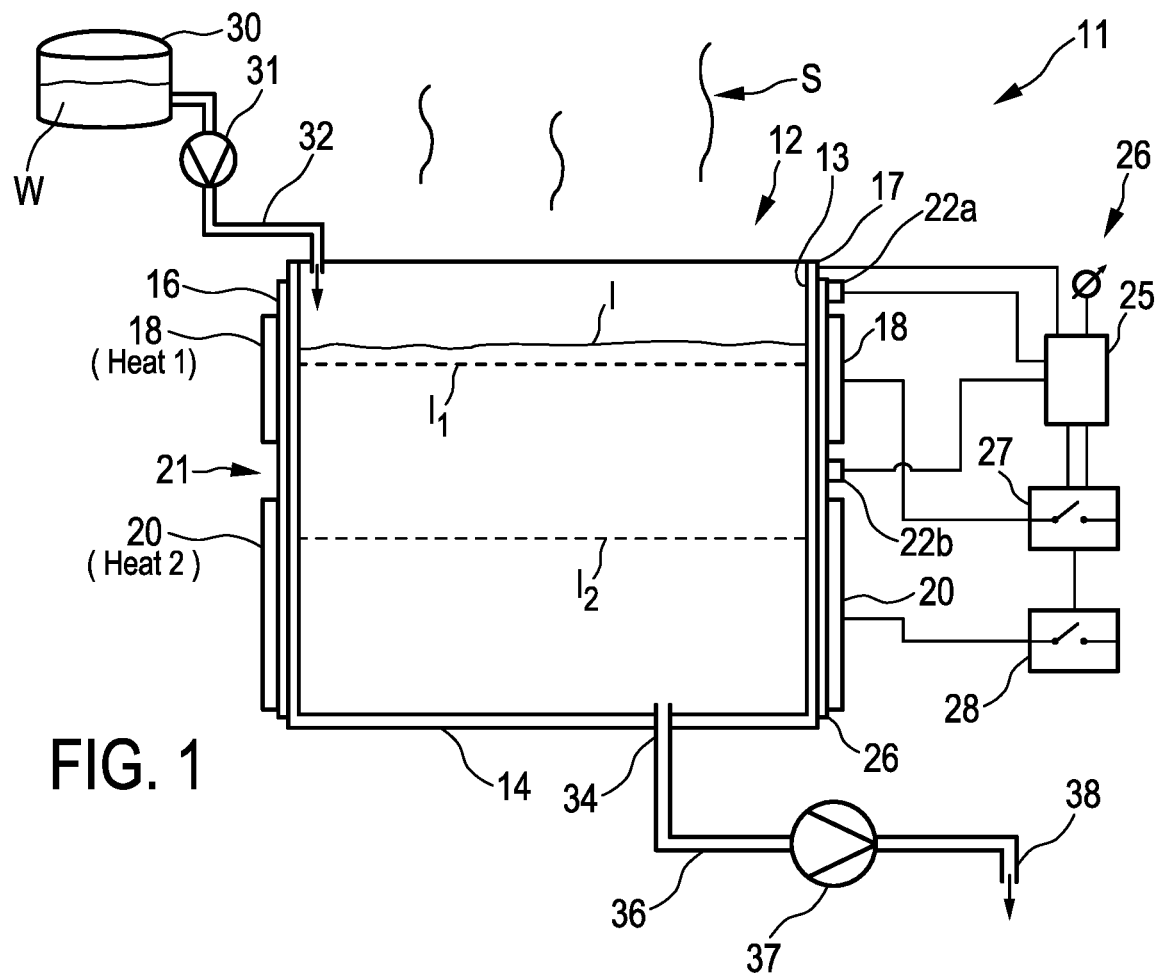
FIG. 1 a schematic overview of a steam generator according to the invention with two heating elements, FIG. 2 a steam cooking device according to the invention with a cooking chamber and a steam generator according to FIG. 1, FIG. 3 a flow diagram according to a method of operating a steam generator according to the invention, wherein both heating elements are operated in the beginning, FIGS. 4 and 5 a simplified view on the steam generator according to FIG. 1 with two different water levels which are reached with both heating elements or with only one heating element activated.

In FIG. 1 a steam generator 11 according to the invention is shown, the steam generator 11 having a water container 12 which advantageously is in the form of a vertical or upright round-cylindrical container. Water container 12 has a circumferential lateral wall 13 and a base plate 14, which are connected in watertight manner. Lateral wall 13 is made of metal, preferably of stainless steel. Base plate 14 can also be made of the same material, alternatively from synthetic material being connected in watertight manner to the lateral wall 13. On top of water container 12 a kind of cover or lid for collecting or concentrating steam S might be provided, for example as known from EP 3 278 691 A1. This is, however, not important for the invention. In any case, the steam S can rise from the water container 12 and be guided in a steam channel or the like to the location of its application. This is described later in FIG. 2.

The outside of lateral wall 13 is preferably mostly covered by a dielectric isolation 16 in the form of a thin layer. Dielectric isolation 16 preferably contains glass or glass ceramic and can be fabricated preferably according to DE 10 2013 200 277 A1 or WO 2007/136268 A1. It is only important that the material of this dielectric isolation 16 is adapted so as to change its resistance behavior strongly at the temperature threshold mentioned before, which is preferably a temperature between 150° C. and 300° C.

An upper heating element 18 is applied onto the dielectric isolation 16 as shown here, which is also denominated by heat 1. The upper heating element 18 may be applied in meandering form or in the form of several parallel stripes or in form of a closed area layout running around the water container 12 or having a circumferential layout, respectively. This is but known from the prior art as mentioned before, for example according to US 2017/0086257 A1. It is preferably a thick film heating element.

A lower heating element 20 is applied on the outside of lateral wall 13 directly onto the dielectric isolation 16. The lower heating element 20 is also denominated by heat 2, and is basically in a shape or form similar to the upper heating element 18, preferably also according to US 2017/0086257 A1. It is important that the upper heating element 18 is located above the lower heating element 20 in vertical direction, which direction in this case is extended from base plate 14 at right angle upwards, which is also the direction that the steam S is taking which rises from water W in the water container 12. There is a distancing ring region 21 between the two heating elements 18 and 20 which is ring-like or runs circumferentially around water container 12. The width of the ring region 21 may be between 5 mm and 20 mm. The heating elements 18 and 20 correspond to the heating devices described before. Both heating elements can have an electrical power of 750 W.

The upper heating element 18 is activated by a switch 27 with which it is connected, wherein switch 27 preferably is connected to an energy source, for example a mains connection of the steam generator 11. This is not shown here, but can easily be conceived by a person skilled in the art. In similar manner, the lower heating element 20 is connected to a switch 28 which is also connected to the same energy source. The switches 27 and 28 are controlled by a control 25 which is the control for the whole steam generator 11, preferably also for a corresponding steam cooking device according to FIG. 2. Control 25 is also connected with a connection 17 to the lateral wall 13 of the water container 12 to measure a leakage current as explained before from one of the heating elements 18 and 20 through the dielectric isolation 16. By connection of the control 25 to switches 27 and 28, a measuring apparatus 26 connected to the control 25 can measure the leakage current through the dielectric isolation 16. For details of such a measuring of leakage current it is pointed to WO 2007/136268 A1 and DE 10 2013 200 277 A1 named before, which is easy for the person skilled in the art to conceive and to put into practice.

An upper temperature sensor 22a is provided on the outside of lateral wall 13, in this case also on the dielectric isolation 16 and slightly above the upper heating element 18 in the vertical direction. A lower temperature sensor 22b is placed between the upper heating element 18 and the lower heating element 20 in the ring region 21, preferably also placed onto the dielectric isolation 16. This is mainly for the reason so that there is sufficient electrical isolation to the metallic lateral wall 13 of the water container 12. The temperature sensors 22a and 22b can be made for point-like temperature detection, for example as NTC temperature sensors in SMD construction manner. They should be attached with a good thermal contact to the lateral wall 13 so as to detect its temperature or the temperature of water W inside the water container 12 and potentially being right on the other side of the lateral wall 13. Temperature sensors 22a and 22b are also connected to the control 25 for evaluation.

For filling water W into the water container 12, a fresh water tank 30 is provided which can also be a connection to a fresh water pipe. By activating a filling pump 31, alternatively opening a valve, water W from the fresh water tank 30 can be pumped into the water container 12, for example until a water level l is reached as is shown here, which is for example about slightly higher than a middle region of the upper heating element 18, but below temperature sensor 22a. This is a water level that can be regarded as very good for generating steam with a high rate with high heating power.

Two water levels are shown in dashed lines, wherein a lower water level l2 is a water level at which, when it is reached and surpassed by water W, the heat generated by the lower heating element 20 in its activation state is absorbed by the water W. The temperature stays beneath a critical temperature Tthr. So the first temperature detection device with the dielectric isolation 16 does not lose its isolating properties, in consequence no leakage current can be measured. If the water level l is beneath lower water level l2, the heat of the lower heating element 20 is not sufficiently absorbed, the temperature rises and reaches the critical temperature Tthr. So a small leakage current starts to flow from the lower heating element 20 through the dielectric isolation 16 to the metallic lateral wall 13 where it can be detected. When the critical temperature Tthr is surpassed, the leakage current has reached a critical value and a critical temperature is detected by control 25 and measuring apparatus 26. In consequence, the lower heating element 20 is deactivated; the upper heating element 18 has not even been active.

In similar manner an upper water level l1 is a water level at which, when it is reached and surpassed by water W, the heat generated by the upper heating element 18 in its activation state is absorbed by the water W. The temperature stays beneath a critical temperature Tthr. In the region of the lower heating element 20 the temperature will most probably not surpass 100° C. for all the heat is absorbed by water W. So the first temperature detection device with the dielectric isolation 16 does not lose its isolating properties, in consequence no leakage current can be measured. If, however, the water level l is beneath upper water level l1, the heat of the upper heating element 18 is not absorbed sufficiently, and the same as described before will happen. So if the water level l is above the upper water level l1, the steam generator can be operating with both heating elements 18 and 20 activated and without overheat problems.

From the base plate 14 a water outlet 34 leads via an outlet pipe 36 to an outlet pump 37. The outlet pump 37 leads to an outlet 38 which may be a waste water outlet into a sewage. The outlet pump 37 is also connected to control 25 and is controlled by control 25.

Figure 2:
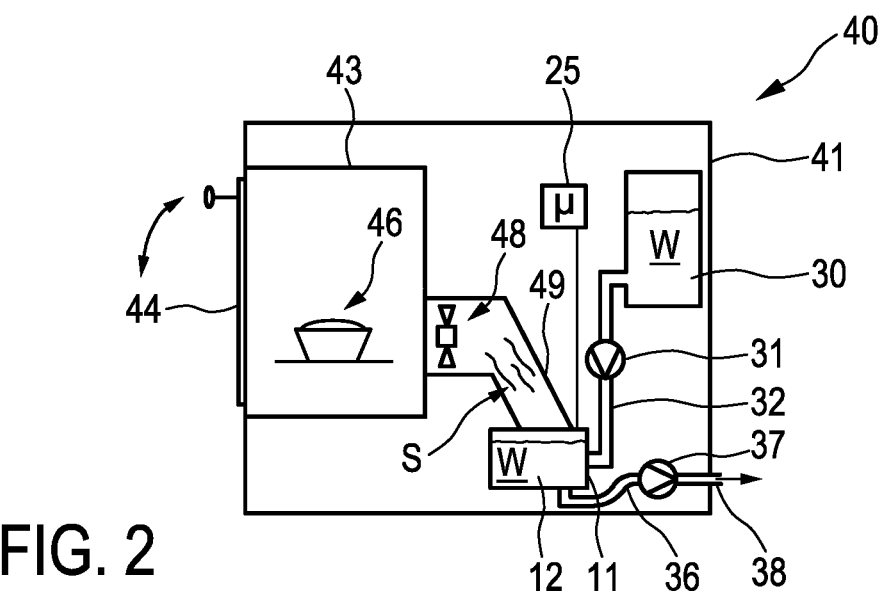

In FIG. 2 a steam cooking device 40 is shown schematically which has a housing 41 and a cooking chamber 43 inside the housing 41. The cooking chamber 43 can be closed with a chamber door 44. Inside the cooking chamber 43 food 46 can be placed for being cooking with the help of hot steam. A ventilator 48 is provided for transporting steam through a steam channel 49 from the steam generator 11 with water W in the water container, wherein the steam S is blown into the cooking chamber 43 in known manner. Furthermore, control 25 is provided for the whole steam cooking device 40. The fresh water tank 30 is provided inside the steam cooking device 40 and is connected via a fresh water pipe 32 and filling pump 31 to the steam generator 11 or its water container 12, respectively.

Figure 3:
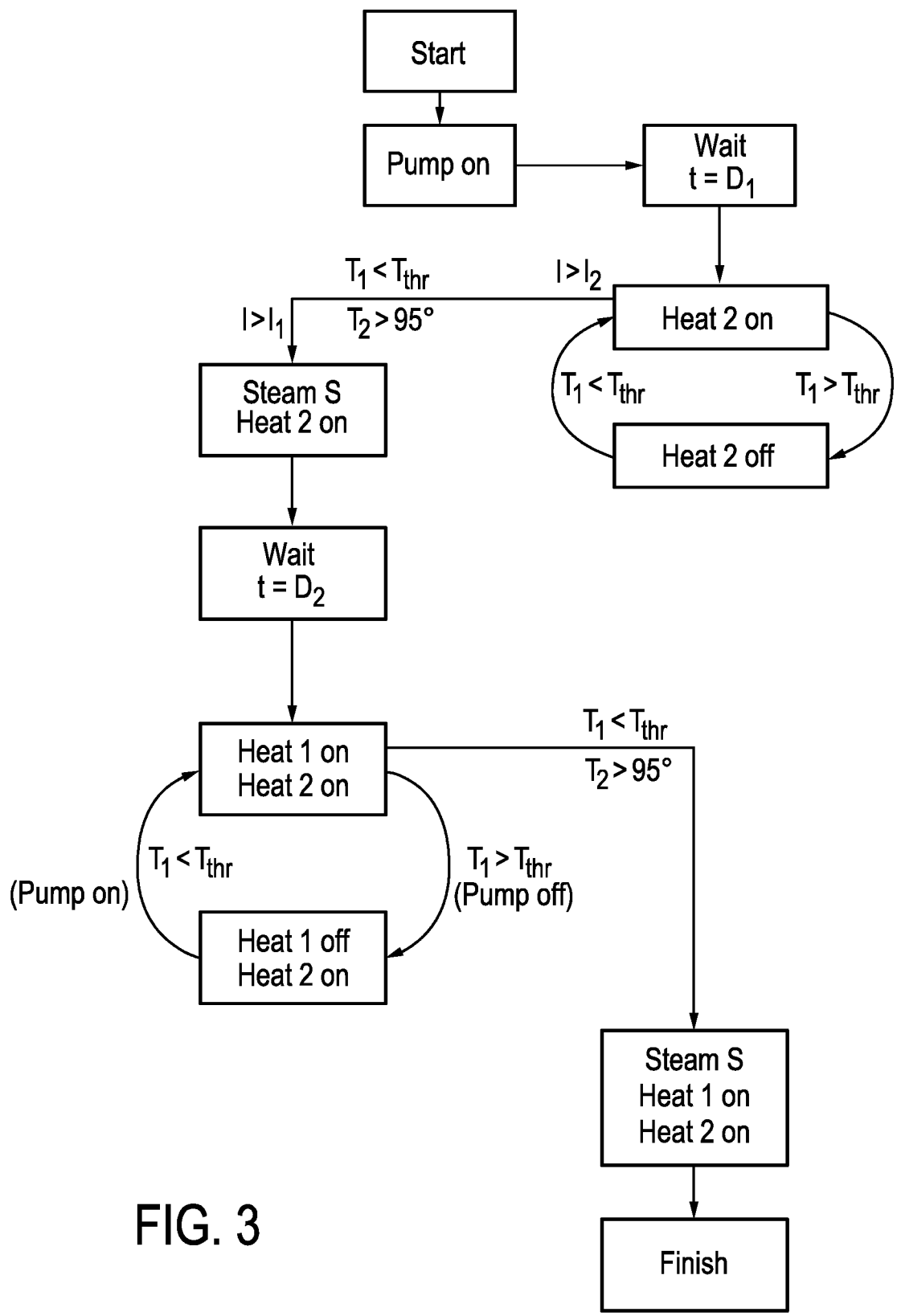
Figure 4:
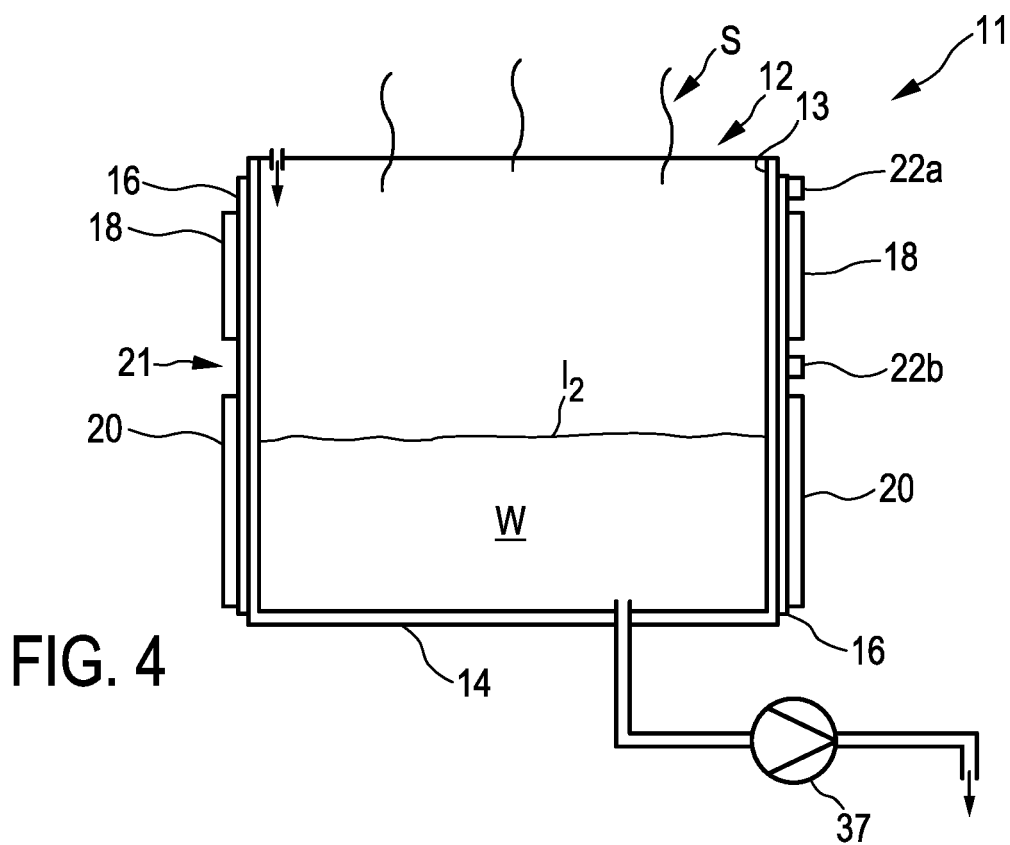

From the flow diagram of FIG. 3 an example of the method according to the invention for operating the steam generator 11 in the steam cooking device 40 can be taken. After operation has started, the filling pump 31 is activated in the second step and starts pumping water W from the fresh water tank 30 into the water container 12. As a filling rate FR of this filling process may not be known, which is due to the fact that the parameters of integrating the steam generator 11 and fresh water tank 30 with fresh water pipe 32 and a valve or the filling pump 31 may not be known to the manufacturer of the steam generator 11. Furthermore, water level sensors directly reacting to a level of water shall be avoided according to the invention. So this step of filling fresh water into the water container 12, which is defined to have been totally empty before, takes place for a first filling duration D1 which may be, for example, for 10 sec up to 20 sec. Then in the third step the upper heating element 18 stays deactivated, whereas the lower heating element 20 is being activated and Heat 2 is on. If the water level until this moment has not yet reached the level l2, the temperature at the lower heating element 20 will quickly rise as its heat cannot be sufficiently absorbed by water W inside the water container 12. So for example after 5 sec to 8 sec after activating the lower heating element 20, the first temperature detection device detects that a temperature T1 has reached and surpassed the first temperature threshold Tthr. As the upper heating element 18 is not active, this critical temperature must be somewhere in the region of the lower heating element 20. So it is deactivated again and Heat 2 is also off, see the fourth step. Then the temperature will sink beneath the first temperature threshold Tthr, and according to step 5 the lower heating element 20 is activated again. If now for a time t of more than 6 sec the temperature T1 does not reach and surpass the first temperature threshold Tthr, this can be taken as a sign that now, as water has still been continuously filled into the water container 12, a water level l has reached and surpassed the water level l2. If, on the other hand, after less than 6 sec or 5 sec the critical temperature of T1 is reached and surpassed again, the same cycle will be started all over. As water is continuously filled or pumped into the water container 12, the water level l will continuously rise until the water level l2 has been reached.

As at the water level l2 the quantity of water W in water container 12 is sufficiently high to continuously operate the lower heating element 20, which will heat the water W up to the boiling point to generate steam S for the operation of the steam cooking device 40, this generation of steam took place rather quick, as obviously only a relatively small quantity of water had to be heated. If the quantity of water would be even less, the lower heating element 20 would have been deactivated more often, which may be taking place for a few times, whereas even during this phase the lower heating element 20 has been active for short periods of time.

Figure 5:
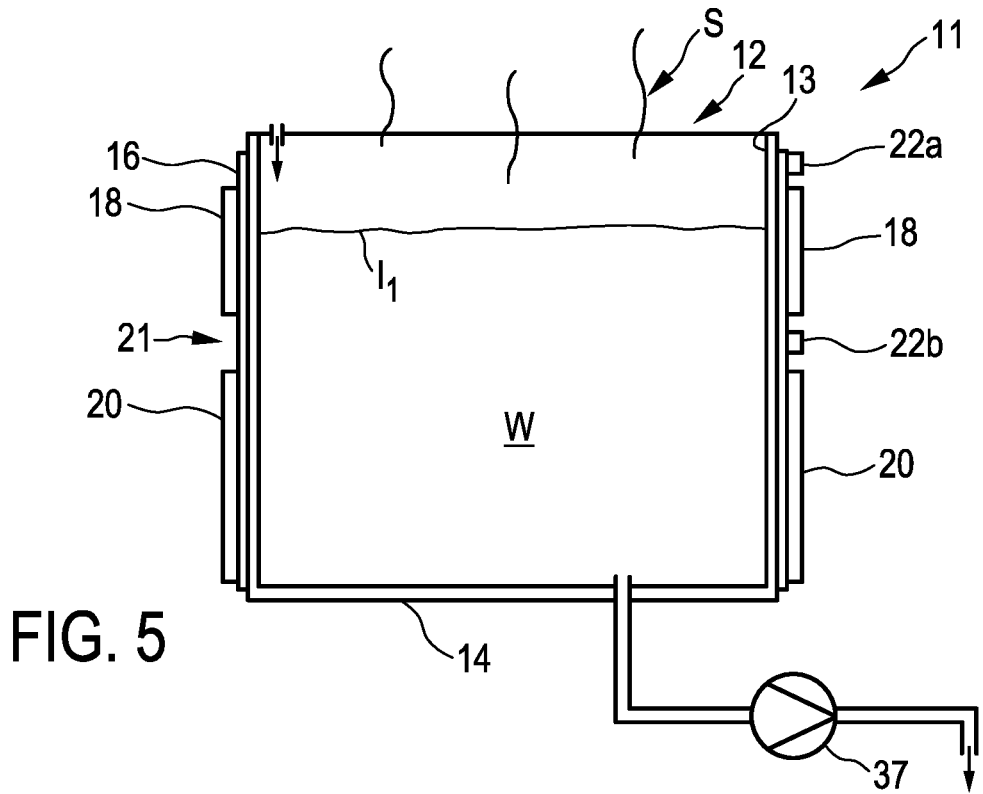

After step 6, when heating only takes place with lower heating element 20, and still water W is continuously filled or pumped into the water container 12, which is also being heated for generating steam, this hot or boiling water reaches with its heat the upper temperature sensor 22a. The temperature of the upper temperature sensor 22a is monitored by the control 25, and as soon as it reaches a temperature of about 95° C., the water level l will have reached the level l1, which is shown in FIG. 5. From FIG. 5 it can be taken that the level l1 is somewhat beneath the position of the upper temperature sensor 22a. However, in practice when the quantity of water W corresponds to this level l1, due to the boiling action of the water W and steam rising up, which also contacts the inside of the lateral wall 13, the temperature rises even without direct contact of very hot or boiling water at the inside of lateral wall 13 opposite the upper temperature sensor 22a.

As the level l1 of the water W has about the same heat absorbing effect to the upper heating element 18 as the lower water level l2 for the lower heating element 20, the upper heating element 18 can be activated. It is possible to wait for a short time, preferably 2 sec to 4 sec, for example 3 sec, after first detecting a temperature T2 of more than 95° C. at the upper temperature sensor 22a, until the upper heating element 18 is activated. The lower heating element 20 already is active, so Heat 1 is on and Heat 2 is on according to step 7. For safety reasons it is checked by monitoring the first temperature detection device whether after a few seconds, for example after a second duration D2 between 5 sec to 10 sec, and whether after activating the upper heating element 18 the temperature T1 reaches and surpasses the first temperature threshold Tthr. If this might be the case, the filling of water W into water container 12 is continued, whereas the upper heating element 18 is deactivated. Filling of water W is still continued, whereas only if the temperature again is below the first temperature threshold Tthr, the upper heating element 18 is activated again.

For the further operation of the steam generator, as the water level l can be supposedly in the region of the upper heating element 18, a pumping of fresh water W into the water container 12 can be stopped after the upper heating element 18 has not been turned off due to a temperature surpassing the first temperature threshold Tthr for 10 sec or 20 sec, for example. If, after that, the temperature T1 again reaches the first temperature threshold Tthr, this means that the water level l has fallen beneath the upper water level l1 and fresh water W has to be filled in again. This is being done according to the last steps of the flow diagram of FIG. 3.

This operation can continue as long as steam S is required, and as long as this steam should be generated with a high steam generating rate.

If, for whatever reason, steam S is only required with a rather low steam generating rate, which may even be after a period of a high steam generating rate, only the lower heating element 20 is operated or activated, respectively.

Then the lower heating element 20 is operated without starting the filling pump 31 again. As soon as a first derivation by time of the temperature T1 reaches a critical value, which means that irrespective of the absolute value of the temperature T it starts to rise rather quickly, the filling pump 31 is activated again to pump more fresh water W into the water container 12. This can be made for a certain given time, for example for 10 sec or for 20 sec. Alternatively, the filling pump 31 can be active until the temperature measured by the first temperature detection device has reached an absolute value that has been detected 2 sec to 20 sec, for example 5 sec to 10 sec, before the significant rise of the first derivation by time of the temperature signal T1 has been detected.

In a further embodiment of the invention, the lower temperature sensor 22b can also be used, in particular if only the lower heating element 20 shall be operated for a lower rate of steam generation. The temperature measured by the second temperature sensor 22b is a good indicator whether the water level l of water W inside the water container 12 has reached its height or is still below. If the water level l has surpassed the second temperature sensor 22b, its temperature will constantly be about 100° C., which can be used as a sign that now or maybe 10 sec to 20 sec afterwards, the filling pump 31 can stop filling water W into the water container 12.

It is also possible with the invention to detect a filling rate of the filling pump 31. This can be done for example by measuring the time until the water level l2 has been reached or even until the upper water level l1 has been reached. Up to this upper water level l1, the filling pump 31 has continuously pumped fresh water W into the water container 12 that has been empty before. Of course, some water has already been evaporated as steam S from the water container 12 by heating with the lower heating element 20, partly also by heating with the upper heating element 18. This quantity of water W evaporated as steam S is, however, neglected for a rough determination of the filling rate. The quantity of water corresponding to water level l1 and water level l2 is known in control 25. The filling rate can then simply be calculated by dividing the known quantity al level l1 or level l2 by the time needed to reach this water level. For an even more precise calculation of the filling rate, the time of activation of the heating elements can be taken into account, and from experiments their steaming rate can be known. From the two parameters a steaming rate can be calculated, which results in an amount of water evaporated by the heating elements. This amount of water has to be added to the water quantity mentioned before as a correction of the calculation for the filling rate, and this sum is then divided by the time needed to reach the corresponding water level. If the filling rate has become smaller during use of the steam generator or the cooking device, respectively, for example during some weeks or months or after 40 to 50 operation cycles, this is a sign for problems with the filling pump or a filling valve, respectively. A repair or a service action can then be called for.

The invention claimed is:

1. A method of operating a steam generator, said steam generator comprising:
   a water container,
   two heating devices on said water container, which are located in different height regions separated from each other in a vertical direction, one said heating device being an upper heating device and an other said heating device being a lower heating device,
   a first temperature detection device covering a temperature detection area, wherein said temperature detection area comprises at least an area covered by said two heating devices,
   a second temperature detection device in a form of a spot-like temperature sensor being located on said water container in a region of an upper border of said upper heating device, and
   a control device for evaluating said first temperature detection device and said second temperature detection device and for activating and deactivating said two heating devices,
   with steps of:
   filling said water container with water for a predefined first filling duration $D_1$,
   after said first filling duration $D_1$ has elapsed, said lower heating device is activated, wherein said water container is continuously filled further with water and wherein said upper heating device is not activated,
   in case said first temperature detection device detects a temperature exceeding a first temperature threshold $T_{thr}$, said lower heating device is deactivated, wherein said water container is filled further with water,
   as soon as said first temperature detection device detects any temperature below said first temperature threshold $T_{thr}$, said lower heating device is activated again,
   as soon as said first temperature detection device detects any temperature below said first temperature threshold $T_{thr}$ for a duration of at least 5 sec, said control device defines a quantity of water in said water container to be between 60% and 90% of a height of an upper rim of said lower heating device, and
   as soon as said second temperature detection device detects a temperature of at least 95° C., said upper heating device and said lower heating device are both activated.

2. The method according to claim 1, wherein said upper heating device is activated and said water container is continuously filled with water, said filling with water is stopped as soon as said first temperature detection device detects a second instance of a temperature below said first temperature threshold $T_{thr}$ for a second duration $D_2$ of between 5 sec and 10 sec.

3. The method according to claim 1, wherein said first temperature detection device detects a temperature above said first temperature threshold $T_{thr}$ after said upper heating device has been activated, only said upper heating device is deactivated.

4. The method according to claim 3, wherein if said first temperature detection device again detects a temperature above said first temperature threshold $T_{thr}$ within 2 sec to 5 sec after deactivating said upper heating device, said lower heating device is also deactivated.

5. The method according to claim 1, wherein a filling rate of filling water into said water container is reduced by at least 5% if a duration of filling said water container until said second temperature detection device detects a temperature of above at least 95° C. is less than a predefined filling duration threshold $D_3$.

6. The method according to claim 5, wherein said filling rate is reduced by clocking a pumping action of a water pump filling water into said water container with said filling rate being a filling rate for the water pump.

7. The method according to claim 1, wherein after filling said water container with water has been stopped for a first time, if said first temperature detection device detects a temperature above said first temperature threshold $T_{thr}$, said upper heating device is deactivated for at least 3 sec, wherein more water is filled into said water container, and said upper heating device is then activated again.

8. The method according to claim 1, wherein steam is generated at a first rate if only said lower heating device is activated and said upper heating device is deactivated.

9. The method according to claim 8, wherein said first rate is between 20% and 90% below a second rate, wherein steam is generated at said second rate if said lower heating device is activated and said upper heating device is activated.

10. The method according to claim 1, wherein a signal for stopping or starting to fill water into said water container is generated by monitoring a first derivation by time of a temperature signal of said first temperature detection device.

11. The method according to claim 1, wherein for deactivating or activating at least one of said two heating devices, an absolute value of a temperature signal of said first temperature detection device is used or a first derivation of the temperature signal by time of said first temperature detection device is used.

12. The method according to claim 11, wherein at least said upper heating device is deactivated or activated.

13. The method according to claim 11, wherein after having filled said water container with water and having stopped a filling process, and wherein said first derivation by time of said temperature signal of said first temperature detection device is above a threshold value $V_{thr}$, filling water into said water container is started again.

14. The method according to claim 13, wherein said filling water into said water container is started again for a predefined second filling duration $D_2$.

15. The method according to claim 13, wherein said filling water into said water container is started again until said temperature signal of said first temperature detection device has reached a temperature signal value corresponding to a previous temperature signal value that occurred between 2 sec and 20 sec before filling said water container with water started.

16. The method according to claim 1, wherein said temperature detected by said first temperature detection device is monitored and a predefined duration is measured until said lower heating device has not been deactivated by a temperature signal of said first temperature detection device for at least 5 sec, and the same is being done for said upper heating device until said upper heating device is not deactivated by said temperature signal of said first temperature detection device, wherein a time is measured until a lower heating device has not been deactivated for at least 5 sec, wherein a measured filling rate $FR_m$ is determined by dividing a known water volume being defined by a location of said lower heating device on said water container by a time that has elapsed when said lower heating device has been activated or has not been deactivated.

17. The method according to claim 16, wherein said measured filling rate $FR_m$ is compared with a predefined filling rate $FR_d$ for said steam generator, wherein if said measured filling rate $FR_m$ is more than 10% below said predefined filling rate $FR_d$, it is determined that a calcification of a filling pump is too high and a decalcification must be made or it is determined that a repair of said filling pump must be made.

18. The method according to claim 17, wherein a signal is output for a user to execute a decalcification process of said filling pump or that said repair of said filling pump must be made.

19. The method according to claim 17, wherein said measured filling rate $FR_m$ is 20%, 30% or 40% below said predefined filling rate $FR_d$.

20. The method according to claim 17, wherein an increased calcification triggers said control device to start and/or stop filling said water container with water with a delay.

21. The method according to claim 20, wherein said delay is between 3 sec and 10 sec.

22. A steam generator comprising:
a water container,
two heating devices on said water container, which are located in different height regions separated from each other in vertical direction, one said heating device being an upper heating device and an other said heating device being a lower heating device,
a first temperature detection device covering a temperature detection area, which temperature detection area comprises at least an area covered by said two heating devices,
a second temperature detection device in a form of a spot-like temperature sensor being located on said water container in a region of an upper border of said upper heating device, and
a control device for evaluating said first temperature detection device and said second temperature detection device and for activating and deactivating said two heating devices, with steps of:
filling said water container with water for a predefined first filling duration $D_1$,
after said first filling duration $D_1$ has elapsed, said lower heating device is activated, wherein said water container is continuously filled further with water and wherein said upper heating device is not activated,
in case said first temperature detection device detects a temperature exceeding a first temperature threshold $T_{thr}$, said lower heating device is deactivated, wherein said water container is filled further with water,
as soon as said first temperature detection device detects any temperature below said first temperature threshold $T_{thr}$, said lower heating device is activated again,
as soon as said first temperature detection device detects any temperature below said first temperature threshold $T_{thr}$ for a duration of at least 5 sec, said control device defines a quantity of water in said water container to be between 60% and 90% of a height of an upper rim of said lower heating device, and
as soon as said second temperature detection device detects a temperature of at least 95° C., said upper heating device and said lower heating device are both activated.

23. The steam generator according to claim 22, wherein said two heating devices are on an outside of said water container.

24. A cooking device comprising:
said steam generator according to claim 22,
a cooking chamber connected with said steam generator, and
a pump for filling said water container with water.

* * * * *